United States Patent
Fukui et al.

(10) Patent No.: US 7,649,295 B2
(45) Date of Patent: Jan. 19, 2010

(54) INSULATION STRUCTURE OF ROTARY ELECTRICAL MACHINERY

(75) Inventors: Kentaro Fukui, Sakura (JP); Akira Kabasawa, Shimotsuke (JP)

(73) Assignee: Honda Motor Co., Ltd., Tokyo (JP)

( * ) Notice: Subject to any disclaimer, the term of this patent is extended or adjusted under 35 U.S.C. 154(b) by 332 days.

(21) Appl. No.: 11/708,042

(22) Filed: Feb. 20, 2007

(65) Prior Publication Data
US 2007/0222324 A1    Sep. 27, 2007

(30) Foreign Application Priority Data
Mar. 24, 2006    (JP)    ............... 2006-082474

(51) Int. Cl.
    *H02K 1/12*    (2006.01)
(52) U.S. Cl. ................... 310/215; 310/260
(58) Field of Classification Search ........... 310/215, 310/260, 254, 259
    See application file for complete search history.

(56) References Cited
U.S. PATENT DOCUMENTS
6,509,665 B1 *    1/2003    Nishiyama et al. ......... 310/215
7,138,741 B2 *    11/2006    Lee ........................... 310/216
7,489,061 B2 *    2/2009    Nishimura ................. 310/215

FOREIGN PATENT DOCUMENTS
JP    2001-112205    4/2001

* cited by examiner

*Primary Examiner*—Dang D Le
(74) *Attorney, Agent, or Firm*—Arent Fox LLP (57) ABSTRACT

An insulation structure of rotary electrical machinery which electrically insulates teeth of a stator from a winding wound on the teeth includes: an insulator made from hard insulation material, disposed on both axial ends of the teeth, and having a side wall disposed along a side surface of the teeth crossing to a circumferential direction thereof, and a high-heat-conductive electrical-insulation resin sheet disposed along the side surface of the teeth and insulating the teeth from the winding, wherein an axial end portion of the high-heat-conductive electrical-insulation resin sheet is disposed between the side wall of the insulator and the side surface of the teeth and is stacked on the side wall in a prescribed axial extent.

5 Claims, 7 Drawing Sheets

INSULATION STRUCTURE OF ROTARY ELECTRICAL MACHINERY

BACKGROUND OF THE INVENTION

1. Field of the Invention

This invention relates to an insulation structure of a rotary electrical machinery such as electric motors or electric generators.

Priority is claimed on Japanese Patent Application No. 2006-082474, filed Mar. 24, 2006, the contents of which are incorporated herein by reference.

2. Description of Related Art

In stators of rotary electrical machinery such as electric motors or electric generators, electrical insulation between an iron core and a winding of the stator is needed. For example, in an electric motor of Japanese Unexamined Patent Application, First Publication No. 2001-112205, teeth are electrically insulated from a winding by providing an insulator formed from a hard insulating material (e.g., a resin) at both ends of the axial direction of the teeth of an iron core, providing an insulating paper along the side surface of the teeth crossing the circumferential direction of the teeth, and providing the insulator and the insulating paper so as to be stacked on each other at the end portion thereof along the axial direction.

The electric motors generate heat at the winding by energizing them. Therefore, it is important to radiate the heat efficiently for downsizing and improving the output of the electric motors. For this purpose, radiating heat efficiently from the iron core by transferring the heat generated at the winding to the teeth via a heat-conductive electrical-insulation resin sheet which is used alternatively to the insulating paper is investigated.

Figure 9:
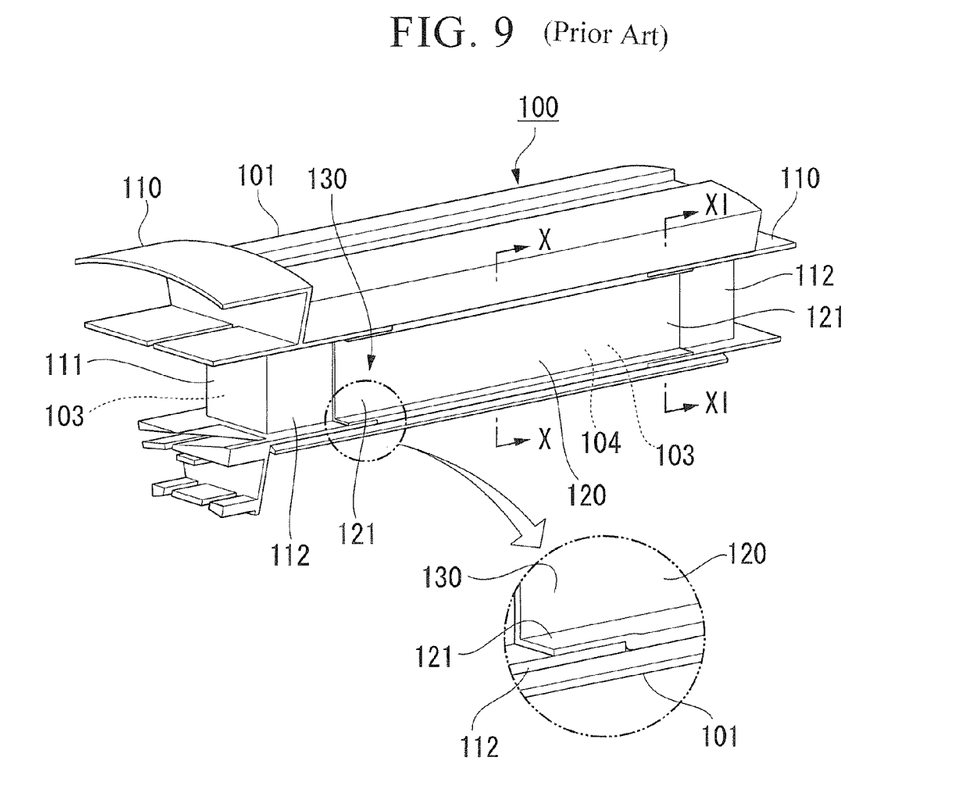
FIG. 9 is a perspective view showing a stator piece before winding having a conventional structure.
Figure 10:
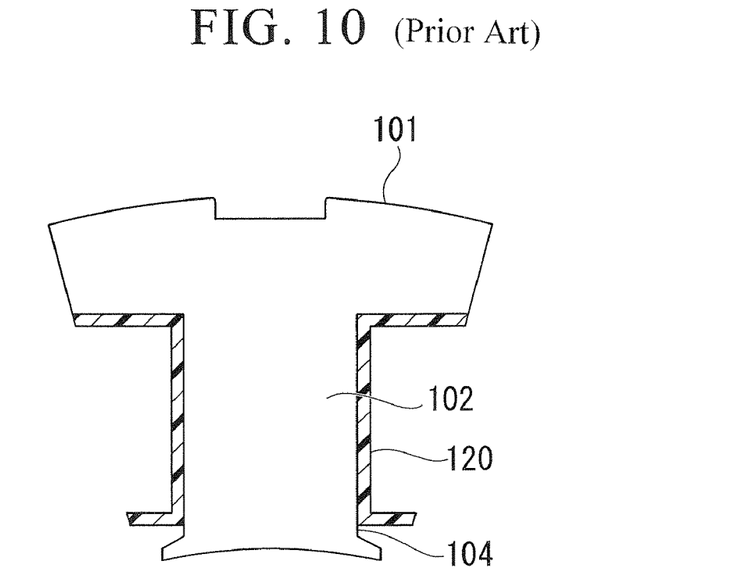
FIG. 10 is a sectional view taken along the line X-X in FIG. 9.
Figure 11:
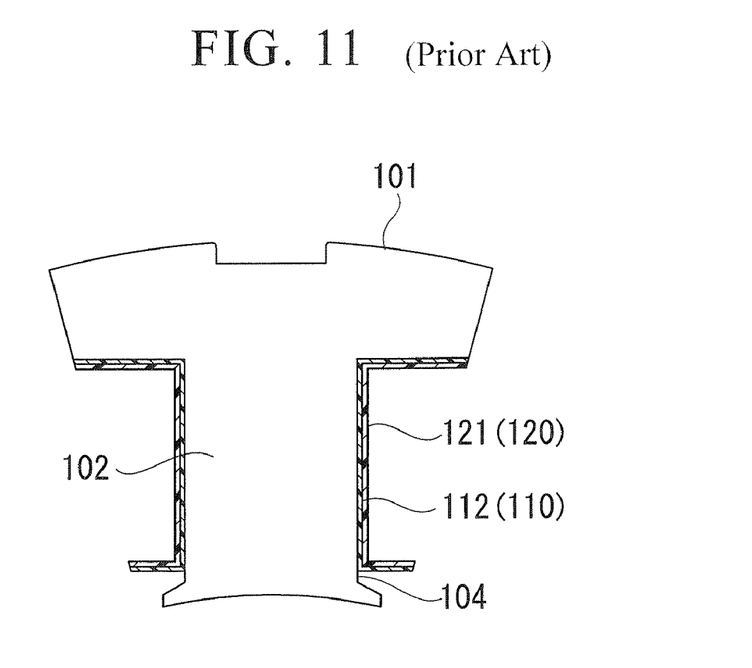
FIG. 11 is a sectional view taken along the line XI-XI in FIG. 9.

FIGS. 9 to 11 show an insulation structure of an electric motor developed prior to the present invention. The stator of the electric motor is constituted from a plurality of stator pieces arranged circularly. FIG. 9 shows a single stator piece 100 before winding. An insulation structure of a combination of a heat-conductive electrical-insulation resin sheet and an insulator is adopted for the stator piece 100. Hereafter, the axial direction of the teeth is the same direction as the axial direction of the stator and conforms to the axial direction of the rotor.

Teeth 102 of an iron core (hereafter, a split iron core) 101 of the stator piece 100 is provided with insulators 110 at both ends along the axial direction. The insulator 110 includes an end wall 111 which is arranged along an axial direction end surface 103 of the teeth 102 and a side wall 112 extending along a side surface 104 of the teeth 102 crossing the circumference direction of the teeth 102. The heat-conductive electrical-insulation resin sheet 120 is arranged so as to cover substantially the whole of the side surface 104 of the teeth 102 along the side surface 104. Axial direction end portions 121 of the heat-conductive electrical-insulation resin sheet 120 are arranged so as to be stacked on the side walls 112 of the insulator 110. A superposition portion 130, which is a stacked combination of the heat-conductive electrical-insulation resin sheet 120 and the insulator 110, is set to a prescribed axial size in order to maintain an insulation range. FIG. 10 shows a cross section of the teeth 102 at the axial middle part. FIG. 11 shows a cross section at the superposition portion 130.

The axial direction end surface 103 of the teeth 102 is electrically insulated from a winding (not illustrated) by the end wall 111 of the insulator 110. The side surfaces 104 of the teeth 102 are electrically insulated from the winding (not illustrated) by the side wall 112 of the insulator 110 and the heat-conductive electrical-insulation resin sheet 120.

The heat-conductive electrical-insulation resin sheet 120 needs to be in contact with the winding in the stator piece 100 for efficiently transferring the heat generated at the winding to the stator piece 100. Therefore, the heat-conductive electrical-insulation resin sheet 120 needs to be thicker than the side wall 112 of the insulator 110.

However, if an end portion 121 of the heat-conductive electrical-insulation resin sheet 120 which is thicker than the side wall 112 of the insulator 110 is stacked on the side wall 112 of the insulator 110, the end portion 121 of the heat-conductive electrical-insulation resin sheet 120 would be elastically compressed by the winding wound thereon, and the side wall 112 of the insulator 110 would be stressed by the reaction force of the compression. The permanence of the insulator 110 is adversely affected by use under stress.

In view of this, a step is formed at the end of the side wall 112 of the insulator 110 in order to thin the side wall 112 at the superposition portion 130 and a step is formed at the end portion 121 of the heat-conductive electrical-insulation resin sheet 120 in order to thin the end portion 121 at the superposition portion 130 so that the thickness of the superposition portion 130 before the winding is wound (i.e., the thickness of the side wall 112 of the insulator 110 and the end portion 121 of the heat-conductive electrical-insulation resin sheet 120) becomes the same as that of the heat-conductive electrical-insulation resin sheet 120 except at the superposition portion 130. Thereby, the deformation volume of the end portion 121 of the heat-conductive electrical-insulation resin sheet 120 is lessened: and the stress applied to the side wall 112 of the insulator 110 can be decreased. However, it is difficult to form the step at the end portion 121 of the heat-conductive electrical-insulation resin sheet 120 since the heat-conductive electrical-insulation resin sheet 120 is comparatively thin.

In addition, a small gap would be unavoidably formed between the side surface 104 and the side wall 112 at the superposition portion 130 since the side wall 112 of the insulator 110 which is in contact with the side surface 104 of the teeth 102 is made from a hard material. As a result, an air layer between the side surface 104 and the side wall 112 is formed, and the heat conduction is deteriorated.

SUMMARY OF THE INVENTION

The present application provides an insulation structure of rotary electrical machinery having exceptional heat conduction and permanence.

In addition, the present invention provides an insulation structure of rotary electrical machinery having exceptional permanence and being easy to manufacture.

In order to solve the above problems, an insulation structure of rotary electrical machinery according to the present invention adopts the following constitutions.

In an insulation structure which electrically insulates teeth of a stator from a winding wound on the teeth, an insulation structure of rotary electrical machinery of the present invention has: an insulator made from hard insulation material, disposed on both axial ends of the teeth, and having a side wall disposed along a side surface of the teeth crossing to a circumferential direction thereof; and a high-heat-conductive electrical-insulation resin sheet disposed along the side surface of the teeth and insulating the teeth from the winding, wherein an axial end portion of the high-heat-conductive electrical-insulation resin sheet is disposed between the side wall of the insulator and the side surface of the teeth and is stacked on the side wall in a prescribed axial extent.

The high-heat-conductive electrical-insulation resin sheet in the present invention means an insulating sheet which has higher thermal conductivity than the insulator.

Owing to this construction, an insulation range between the winding and an iron core (teeth) can be maintained since the side wall of the insulator and the high-heat-conductive electrical-insulation resin sheet are stacked on the prescribed axial extent.

The high-heat-conductive electrical-insulation resin sheet is disposed at the inner of the insulator at a superposition portion on which the insulator and the high-heat-conductive electrical-insulation resin sheet are stacked. Therefore, the high-heat-conductive electrical-insulation resin sheet is in close contact with the side surface of the teeth: and there is no air layer between the high-heat-conductive electrical-insulation resin sheet and the teeth. Therefore, even at this superposition portion, the heat generated in the winding can be conducted efficiently from the high-heat-conductive electrical-insulation resin sheet to the teeth and can be radiated via the iron core.

In addition, since the high-heat-conductive electrical-insulation resin sheet is disposed between the teeth and the insulator at the superposition portion, the insulator does not rattle; therefore oscillations and noise can be prevented.

In the insulation structure of the present invention, the thickness of a superposition portion which is stacked on the insulator may be smaller than that of a non-superposition portion which is not stacked on the insulator.

Owing to this construction, deformation volume of the high-heat-conductive electrical-insulation resin sheet can be reduced at the superposition portion in which the insulator and the high-heat-conductive electrical-insulation resin sheet. Therefore, the stress applied to the side wall of the insulator can be decreased by the reaction force of the elastically deformed high-heat-conductive electrical-insulation resin sheet.

The other aspect of the present invention is an insulation structure of rotary electrical machinery in which teeth of a stator are insulated from a winding wound on the teeth, the insulation structure has: an insulator made from hard insulation material, disposed on both axial ends of the teeth, and having a side wall disposed along a side surface of the teeth crossing to a circumferential direction thereof; and a high-heat-conductive electrical-insulation laminated resin sheet formed by laminating a plurality of high-heat-conductive electrical-insulation resin sheets each varying an axial length thereof, disposed along the side surface of the teeth, and insulating the teeth from the winding, wherein an axial end portion of the high-heat-conductive electrical-insulation laminated resin sheet is stacked on the side wall of the insulator in a prescribed axial extent.

The high-heat-conductive electrical-insulation laminated resin sheet in the present invention means an insulating sheet which has higher thermal conductivity than the insulator.

Owing to this construction, an insulation range between the winding and an iron core (teeth) can be maintained since the side wall of the insulator and the high-heat-conductive electrical-insulation laminated resin sheet are stacked on the prescribed axial extent.

In addition, the high-heat-conductive electrical-insulation laminated resin sheet of which thickness at the axial end is smaller than at the middle of the axial direction can be easily manufactured. As a result, the insulation structure which can decrease the stress applied to the side wall of the insulator in a state of stacking the axial end of the insulator and the axial end of the high-heat-insulating laminated resin sheet can be easily constructed.

The abovementioned invention can be applied when either the insulator or the high-heat-conductive electrical-insulation laminated resin sheet is disposed on the inner side so as to contact with the teeth at the superposition portion at which the insulator and the high-heat-conductive electrical-insulation laminated resin sheet are stacked.

In the above aspects of the present invention, an axial length of the high-heat-conductive electrical-insulation resin sheet (high-heat-conductive electrical-insulation laminated resin sheet) stacked on the side wall of the insulator may be set based on the diameter of the stator.

Owing to this construction, the insulation range between the winding and the iron core (teeth) can be set appropriately.

According to the present invention, a stator having exceptional insulation and heat radiation (cooling effect) can be constituted. As a result, the heat generated in the winding can be efficiently radiated, so that the cooling effect of the rotary electrical machinery can be improved and the area capable of running continuously can be expanded.

In addition, since the temperature of the winding can be decreased, the electrical resistance and the copper loss can be reduced.

Furthermore, the high-heat-conductive electrical-insulation resin sheet is disposed between the teeth and the insulator at the superposition portion at which the insulator and the high-heat-conductive electrical-insulation resin sheet are stacked. Therefore, the insulator does not rattle: and oscillations and noise can be prevented.

According to the present invention, the stress applied to the side wall of the insulator can be reduced at the superposition portion. Therefore, the permanence of the insulator can be improved, and the life span of the rotary electrical machinery can be increased.

According to the present invention, a stator and rotary electrical machinery having exceptional insulation, permanence, and productivity can be constructed.

According to the present invention, the insulation range between the winding and the iron core (teeth) can be set appropriately.

DETAILED DESCRIPTION OF THE INVENTION

An embodiment of an insulation structure of rotary electrical machinery according to the present invention will explained below referring to FIGS. 1 to 8. The rotary electrical machinery in this embodiment is an aspect of a driving electric motor for a hybrid vehicle.

Figure 7:
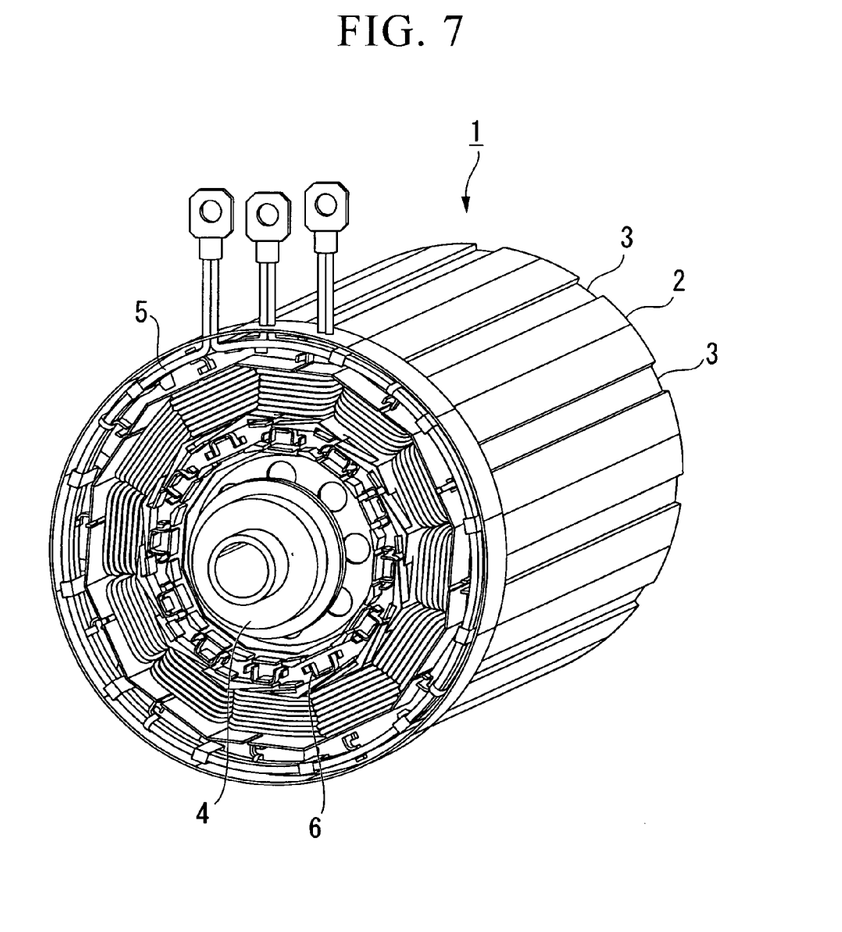
FIG. 7 is a perspective view showing the assembly of a stator and a rotor of the electrical machinery of the embodiment.

FIG. 7 is a perspective view showing an electric motor 1 in a state of a housing being detached therefrom. The electric motor is provided with a stator 2 and a rotor 4 rotating inside of the stator 2.

The explanation of the rotor 4 is omitted since it is not an essential point of the present invention. However, the stator 2 will be explained in detail. Hereinafter, "axial direction" in this description means the same direction as the axial direction of the stator 2 and the rotor 4.

Figure 8:
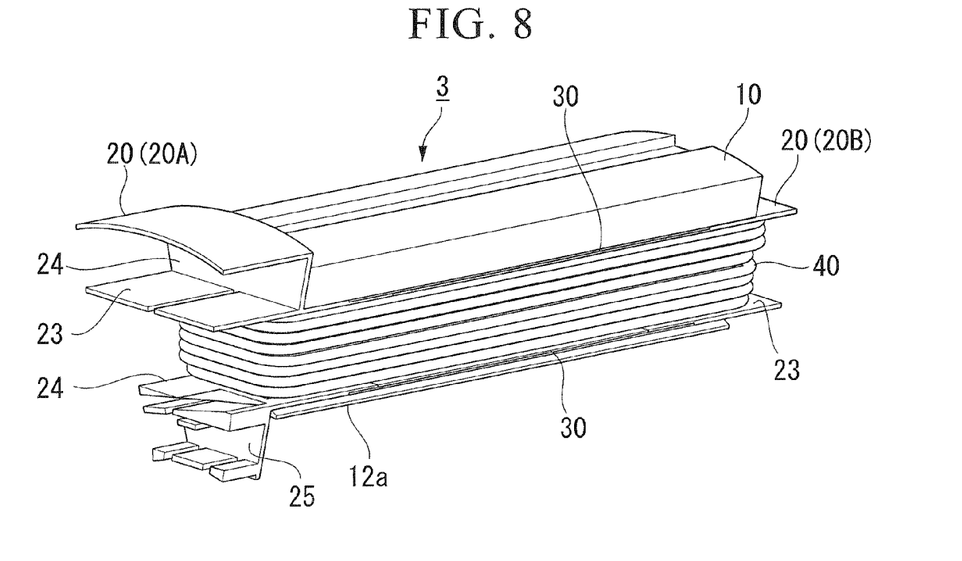
FIG. 8 is a perspective view showing the stator piece after the winding is wound.

The stator 2 is constructed by connecting a plurality of stator pieces 3 into a ring-shape. The single 8 prior to connecting into the ring shape is shown in FIG. 8.

The stator piece 3 is provided with a split iron core 10 constructed by stacking silicon steel plates punched out into substantially T-shape, hard insulators 20A and 20B disposed at both axial ends of the split iron core 10, a pair of heat-conductive electrical-insulation resin sheets (high-heat-conductive electrical-insulation resin sheet) 30 disposed along each side surface of the split iron core 10, and a winding 40 wound on the insulators 20A, 20B, and the heat-conductive electrical-insulation resin sheet 30.

Figure 2:
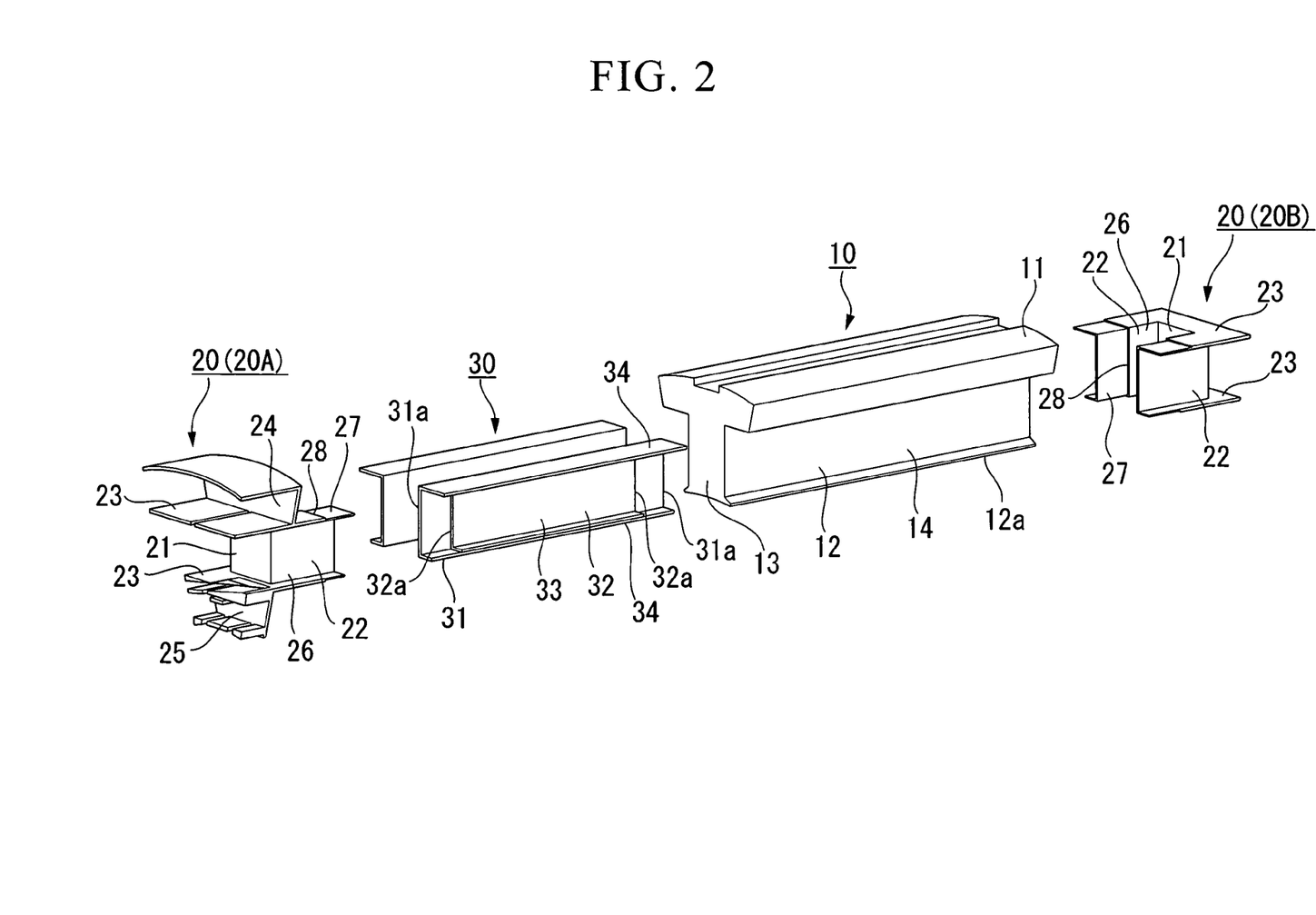
FIG. 2 is an exploded perspective view showing the stator piece.

As shown in FIG. 2, the split iron core 10 has yokes 11 disposed radially outside of the stator 2 and tooth 12 protruding radially inward from the middle of the yoke 11. Flange 12a is formed so as to protrude from a distal end of the teeth 12 along the circumferential direction. The yokes 11 of the stator pieces 3 adjacent to each other are connected into a ring-shape when the stator 2 is assembled by arranging the stator pieces 3 into a ring-shape.

Each of the insulators 20A and 20B is formed by one-piece molding a synthetic resin or the like and has an end wall 21 disposed along an axial end surface 13 of the teeth 12, side walls 22 extending along side surfaces 14 of the teeth 12 crossing a circumferential direction of the teeth 12, and flanges 23 projecting from an upper end and a lower end of the end wall 21 and the side wall 22 outwardly and arranged opposing to the yoke 11 or the flange 12a of the teeth 12. A distribution member storage portion 24 and a mid-point terminal storage portion 25 extending from the upper and lower flanges 23 connected to the end wall 21 are formed on the insulator 20A: the distribution member storage portion 24 and 25 are not formed on the other 20B. The insulator 20A and the insulator 20B are not different in their construction except for the presence of the distribution member storage portion 24 and the mid-terminal storage portion 25. Hereinafter, the insulators 20A and 20B are simply referred as an insulator 20 when it is unnecessary to distinguish them.

As shown in FIG. 7, distribution bus-rings 5 for three-phases are attached to the distribution member storage portions 24 of the stator pieces 3 arranged circularly and are connected respectively to one end of the winding 40 of the stators 3 corresponding the phase. The other ends of the windings 40 are connected to each other via terminals 6 attached to the mid-terminal storage portions 25 of the stators 3.

The side wall 22 of the insulator 20 and the upper and lower flanges 23 are formed as a thick portion 26 in an extent from the connection portion with the end wall 21 to a prescribed size along the axial direction. A thin portion 27 thinner than the thick portion 26 is formed at distal side of the thick portion 26. The outer surfaces of the thick portion 26 and the thin portion 27 are flushed. Between the inner surfaces of the thick portion 26 and the thin portion 27, a step 28 equal to the thickness difference is formed.

The heat-conductive electrical-insulation resin sheet 30 is a high-heat-conductive electrical-insulation laminated resin sheet which is constituted by stacking two sheets 31 and 32 each varying an axial length thereof, and has a side wall 33 disposed along the side surface 14 of the teeth 12 and flanges 34 projecting from the upper and the lower end of the side wall 33 toward the outside and being disposed opposing the yoke 11 or the flange 12a of the teeth 12.

The sheets 31 and 32 are made from resin sheets which are superior in heat conductivity and electrical insulation, and have elasticity. In particular, the heat conductivity of the sheets 31 and 32 is larger than that of the insulator 20. Both axial ends of the outer sheet 32 which is disposed outside are positioned further inward than both axial ends of the inner sheet 31 which is disposed inside. Therefore, the axial length of the inner sheet 31 is longer than the outer sheet 32. The axial length of the inner sheet 31 projecting from the axial ends of the outer sheet 32 is set the same as the axial length of the thin portion 27 of the insulator 20.

The thickness of the inner sheet 31 is substantially equal to the difference between the thickness of the thick portion 26 and the thin portion 27 of the insulator 20. The thickness of the outer sheet 32 is slightly smaller than the thickness of the thin portion 27 of the insulator 20.

Figure 1:
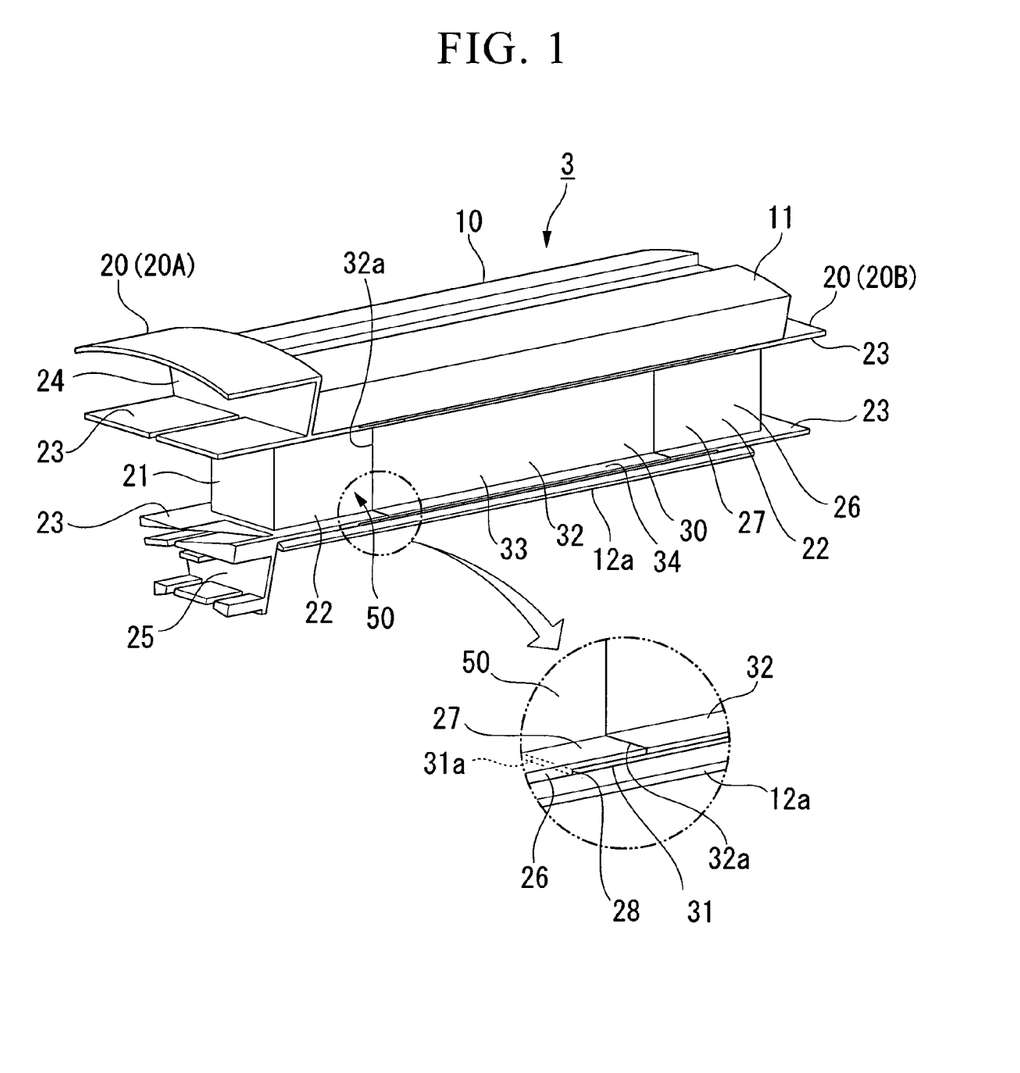
FIG. 1 is a perspective view showing a stator piece before a winding is wound in a stator having an insulation structure of rotary electrical machinery according to an embodiment of the present invention.
Figure 3:
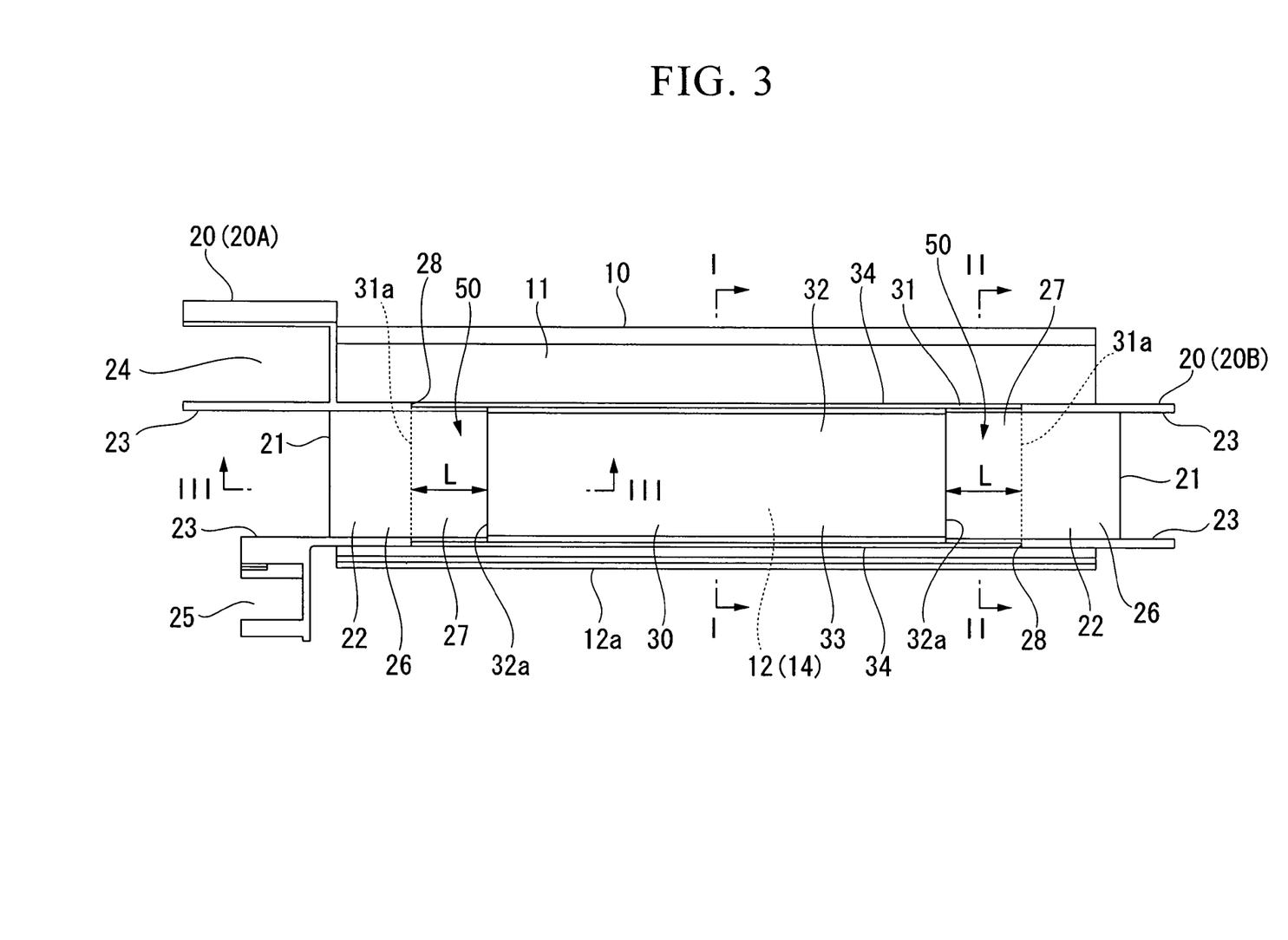
FIG. 3 is a side view showing the stator piece.
Figure 4:
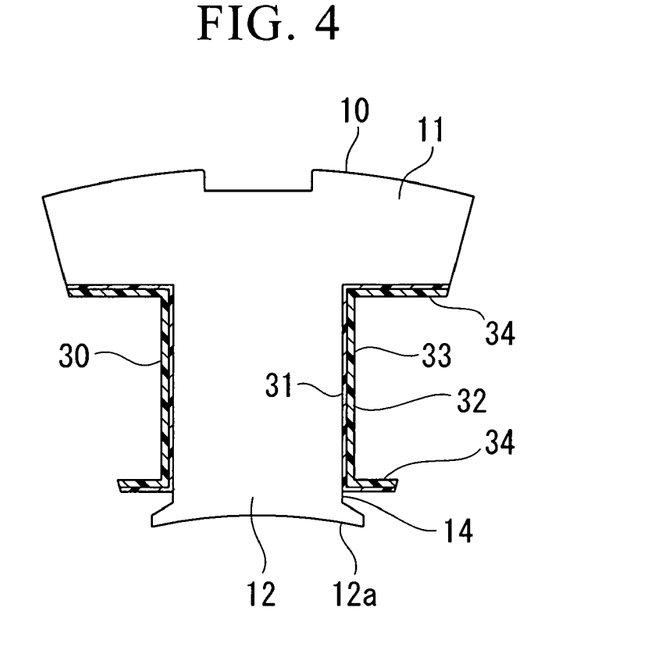
FIG. 4 is a sectional view taken along the line I-I in FIG. 3.
Figure 5:
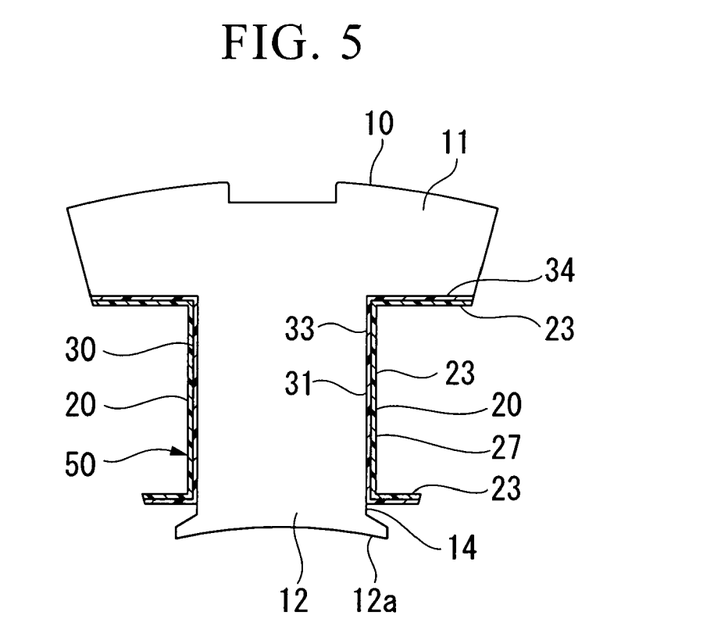
FIG. 5 is a sectional view taken along the line II-II in FIG. 3.
Figure 6:
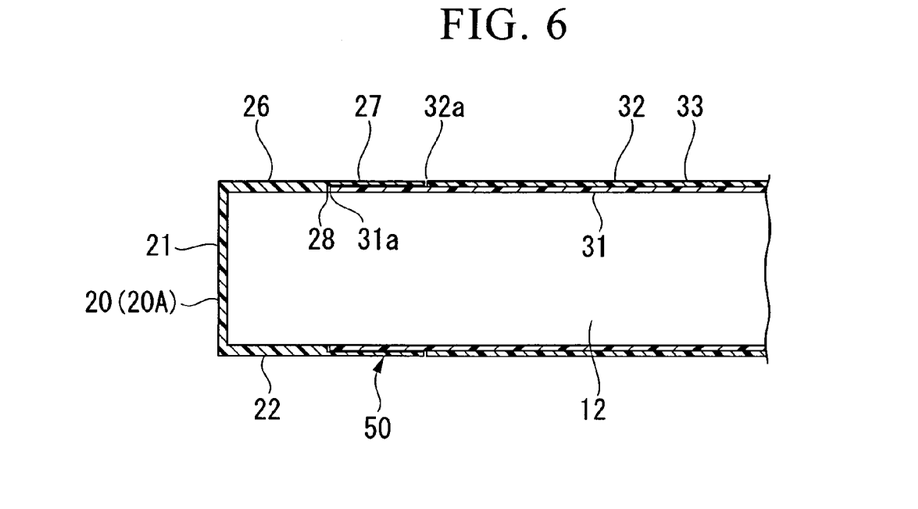
FIG. 6 is a sectional view taken along the line III-III in FIG. 3.

The heat-conductive electrical-insulation resin sheet 30 is arranged at substantially the axial center of the side surface 14 of the teeth 12 as shown in FIGS. 1 and 3 is attached so that the inner sheet 31 at the side wall 33 is in close contact with the side surface 14 as shown in FIGS. 4 and 5.

The insulator 20 is attached on the heat-conductive electrical-insulation resin sheet 30 mounted on the split iron core 10. The end wall 21 of the insulator 20 is in contact with the axial end surface 13 of the teeth 12. The thick portion 26 formed at the side wall 22 of the insulator 20 is in contact with the side surface 14 of the teeth 12. The thin portion 27 formed at the side wall 22 of the insulator 20 is in contact with the inner sheet 31 axially projecting from the outer sheet 32 at the heat-conductive electrical-insulation resin sheet 30. The step 28 is abutted to an axial end 31a of the inner sheet 31. The axial end of the thin portion 27 of the insulator 20 is abutted to an axial end 32a of the outer sheet 32.

An axial length L of a superposition portion 50 at which the insulator 20 and the heat-conductive electrical-insulation resin sheet 30 are stacked (see FIG. 3) is maintained at least larger than a range which can maintain the insulation between the winding 40 and the split iron core 10 (i.e., insulation range). The insulation range is set in accordance with the diameter and supply voltage of the stator 2. An example of the insulation range is shown in TABLE 1.

TABLE 1

| | Insulation Range (along surface) | |
| --- | --- | --- |
| | Diameter of Stator | |
| Voltage [V] | Not more than 178 mm | More than 178 mm |
| 0~125 | 2.4 mm | 6.4 mm |
| 126~250 | 2.4 mm | 6.4 mm |
| 251~600 | 12.7 mm | 12.7 mm |

The winding 40 is wound on the end wall 21 and the side wall 22 of the insulator 20 and the outer sheet 32 of the heat-conductive electrical-insulation resin sheet 30 at the side wall 33.

In the stator piece 3 of the stator 2 constituted as above, in a state prior to wind the winding 40, the outer surface of the outer sheet 32 of the heat-conductive electrical-insulation resin sheet 30 is slightly outwardly projected from the outer surface of the thin portion 27 of the insulator 20. Thereby, the outer sheet 32 of the heat-conductive electrical-insulation resin sheet 30 is elastically compressed by the tension of the winding 40 when the winding 40 is wound. Therefore, the winding 40 is in close contact with the heat-conductive electrical-insulation resin sheet 30 without making a gap, the inner sheet 31 of the heat-conductive electrical-insulation resin sheet 30 is in close contact with the side surface 14 of the teeth 12 without making a gap, and there is no air layer between the inner sheet 31 and the teeth 12. As a result, the heat generated on the winding 40 can be conducted to the heat-conductive electrical-insulation resin sheet 30 efficiently and further conducted to the teeth 12 from the heat-conductive electrical-insulation resin sheet 30 efficiently. Therefore, the heat generated on the winding 40 can be radiated efficiently via the split iron core 10 of the stator 2.

In addition, when focusing the superposition portion 50 at which the insulator 20 and the heat-conductive electrical-insulation resin sheet 30 are stacked in the stator piece 3, the inner sheet 31 of the heat-conductive electrical-insulation resin sheet 30 is also disposed inside the thin portion 27 of the insulator 20 in the superposition portion 50. Thereby, the inner sheet 31 is in close contact with the side surface 14 of the teeth 12, and there is no air layer between the inner sheet 31 and the teeth 12. Therefore, the heat generated on the winding 40 can be conducted from the heat-conductive electrical-insulation resin sheet 30 efficiently also at the superposition portion 50. As a result, the heat generated on the winding 40 can be radiated via the split iron core 10 of the stator 2.

Thus, since the heat generated on the winding 40 can be radiated efficiently, cooling capability of the electric motor 1 can be improved and an area capable of continuous running can be enlarged.

In addition, since the temperature of the winding 40 can be reduced, the electric resistance of the winding 40 and the copper loss can be reduced.

Furthermore, since the inner sheet 31 of the heat-conductive electrical-insulation resin sheet 30 is disposed between the teeth 12 and the insulator 20 in the superposition portion 50, the insulator 20 does not rattle. Also, vibrations and noises generated between an insulator and the teeth of the prior construction scarcely occur.

The thickness of the heat-conductive electrical-insulation resin sheet 30 at the superposition portion 50 (i.e., the thickness of the inner sheet 31) is smaller than the thickness of the heat-conductive electrical-insulation resin sheet 30 except for the superposition portion 50, (i.e., the thickness of a non-superposition portion, the sum of the thicknesses of the inner sheet 31 and the outer sheet 32). The thickness of the stacked combination of the outer sheet 32 and the thin portion 27 of the insulator 20 is set as substantially the same as the thickness of the thick portion 26 of the insulator 20. Therefore, the deformation value of the inner sheet 31 at the superposition portion 50 when the winding 40 is wound is small, and the stress applied to the side wall 22 of the insulator 20 by the reaction of the outer sheet 32 which is elastically deformed is small. As a result, the influence of the heat-conductive electrical-insulation resin sheet 30 upon the permanence of the insulator 20 is extremely small; thus, the permanence of the insulator 20 can be improved. As a result, the lifetime of the electric motor 1 can be extended.

Furthermore, even though the heat-conductive electrical-insulation resin sheet 30 varies the thickness at the superposition portion 50 and the other portion, since this structure which varies the thickness is constructed by stacking the inner sheet 31 and the outer sheet 32, the heat-conductive electrical-insulation resin sheet 30 can easily be produced, and the productivity can be improved.

Other Embodiment

In addition, the present invention is not limited to the above embodiment.

For example, the rotary electrical machinery may be not only the electric motor but an electric generator.

The high-heat-conductive electrical-insulation resin sheet is a double layer construction in the above embodiment. However, the high-heat-conductive electrical-insulation resin sheet may have a multi layer construction of a triple layer or more.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An insulation structure of rotary electrical machinery which electrically insulates teeth of a stator from a winding wound on the teeth comprising:
    an insulator made from hard insulation material, disposed on both axial ends of the teeth, and having a side wall disposed along a side surface of the teeth crossing to a circumferential direction thereof; and
    a high-heat-conductive electrical-insulation resin sheet disposed along the side surface of the teeth and insulating the teeth from the winding, wherein
    an axial end portion of the high-heat-conductive electrical-insulation resin sheet is disposed between the side wall of the insulator and the side surface of the teeth and is stacked on the side wall in a prescribed axial extent.

2. The insulation structure of rotary electrical machinery according to claim 1, wherein a thickness of a superposition portion of the high-heat-conductive electrical-insulation resin sheet which is stacked on the insulator is smaller than a thickness of a non-superposition portion of the high-heat-conductive electrical-insulation resin sheet which is not stacked on the insulator.

3. The insulation structure of rotary electrical machinery according to claim 1, wherein an axial length at which the high-heat-conductive electrical-insulation resin sheet and the side wall of the insulator are stacked is set based on a diameter of the stator.

4. An insulation structure of rotary electrical machinery which electrically insulates teeth of a stator from a winding wound on the teeth comprising:
    an insulator made from hard insulation material, disposed on both axial ends of the teeth, and having a side wall disposed along a side surface of the teeth crossing to a circumferential direction thereof; and
    a high-heat-conductive electrical-insulation laminated resin sheet formed by laminating a plurality of high-heat-conductive electrical-insulation resin sheets each varying an axial length thereof, disposed along the side surface of the teeth, and insulating the teeth from the winding, wherein an axial end portion of the high-heat-conductive electrical-insulation laminated resin sheet is stacked on the side wall of the insulator in a prescribed axial extent.

5. An insulation structure of rotary electrical machinery according to claim 4, wherein an axial length at which the high-heat-conductive electrical-insulation laminated resin sheet and the side wall of the insulator are stacked is set based on a diameter of the stator.

* * * * *